United States Patent [19]

Fukino et al.

[11] Patent Number: 4,610,517
[45] Date of Patent: Sep. 9, 1986

[54] CLAMP FOR LENS HOOD

[75] Inventors: Kunihiro Fukino, Fujisawa; Yoshiro Kotaka, Tokyo, both of Japan

[73] Assignee: Nippon Kogaku K. K., Tokyo, Japan

[21] Appl. No.: 663,487

[22] Filed: Oct. 22, 1984

[30] Foreign Application Priority Data

Oct. 24, 1983 [JP] Japan .................... 58-163276[U]

[51] Int. Cl.⁴ .................... G02B 7/00; F16L 37/12
[52] U.S. Cl. .................... 350/580; 285/404; 350/257
[58] Field of Search .................... 350/580–581, 350/257, 318; 285/328, 404, 405, 417; 403/338, 360

[56] References Cited

U.S. PATENT DOCUMENTS

| 25,283 | 8/1859 | Smith | 285/404 |
| 1,767,850 | 6/1930 | Howell | 350/318 |
| 4,384,767 | 5/1983 | Kawai | 350/580 |

Primary Examiner—William H. Punter
Attorney, Agent, or Firm—Shapiro and Shapiro

[57] ABSTRACT

A clamping device for camera accessories includes a cylindrical adaptor member defining a lens hood. The inner periphery of the adaptor member is formed with an annular collar member which has an internal diameter smaller than the external diameter of a collar formed on the outer sleeve of a lens barrel along a V-shaped groove which is formed on the outer periphery of the outer sleeve. The collar member serves to prevent the hood from connecting with the lens barrel at an undesirable position.

8 Claims, 5 Drawing Figures

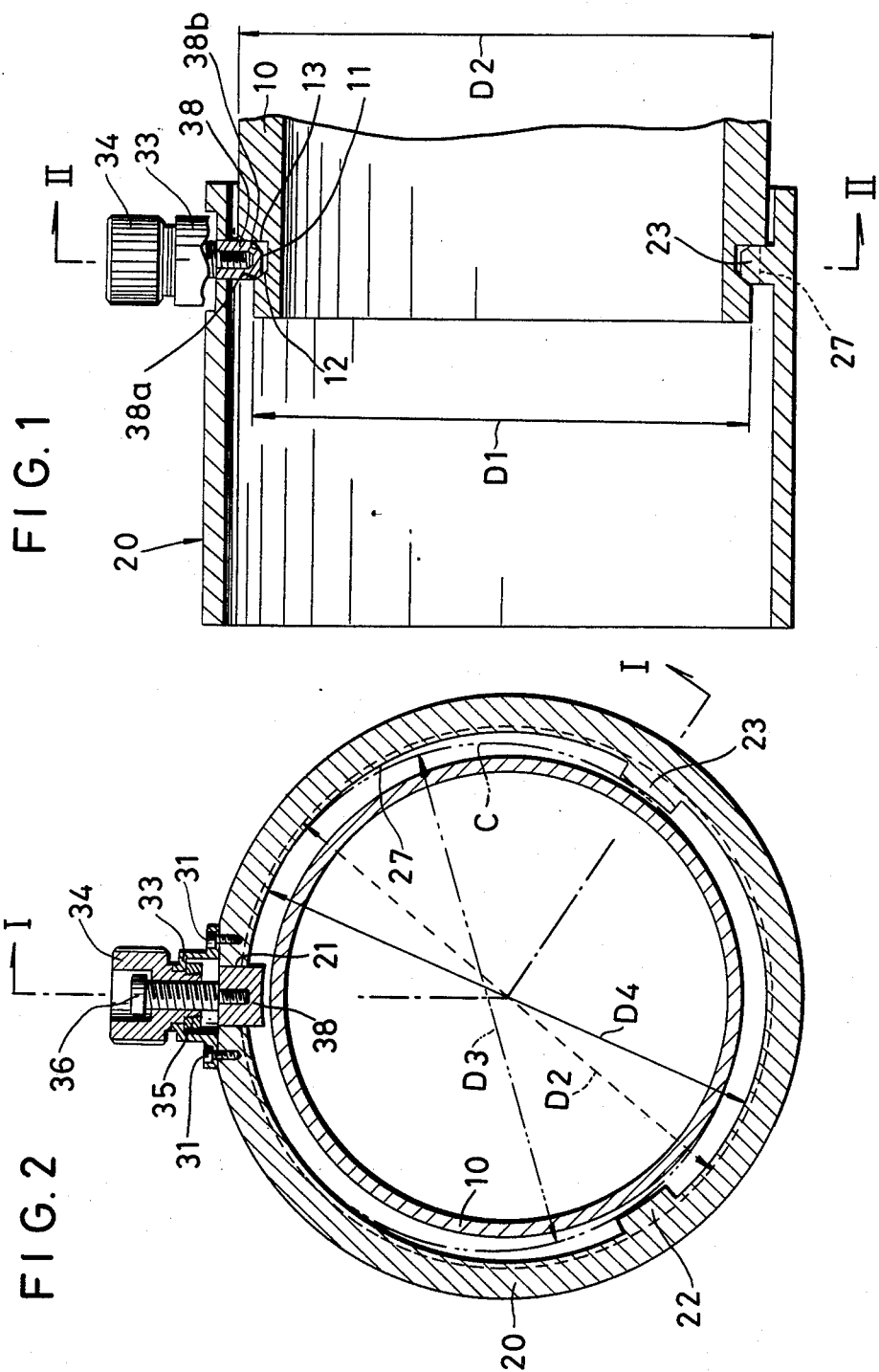

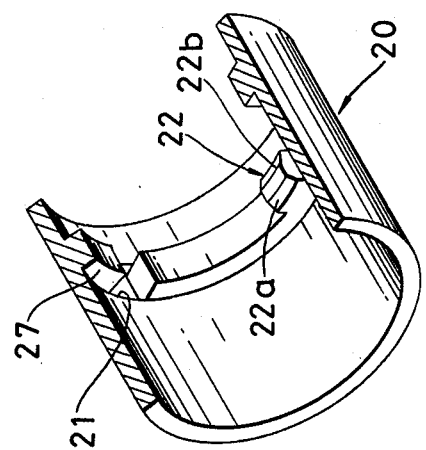
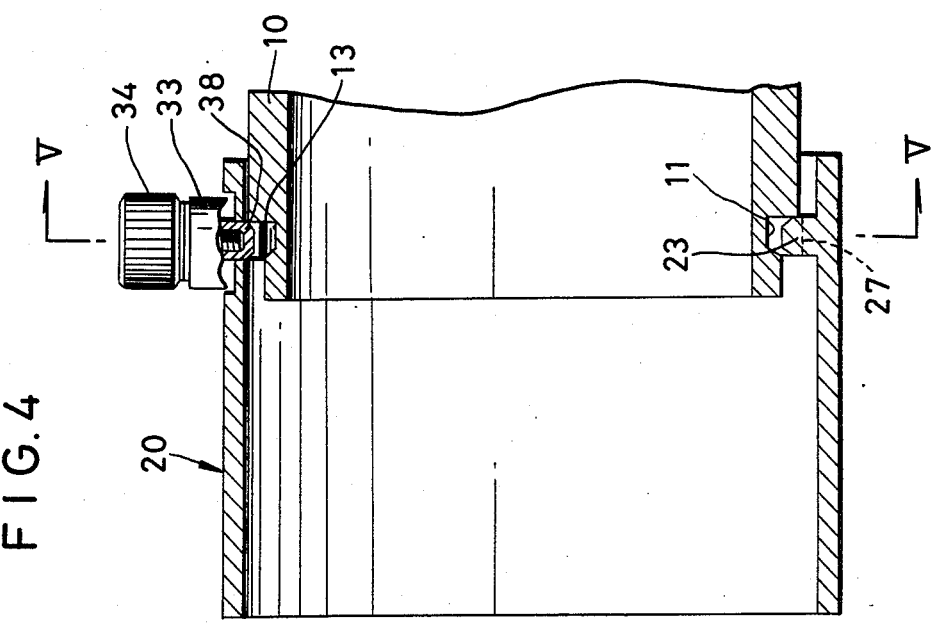

CLAMP FOR LENS HOOD

BACKGROUND OF THE INVENTION

1. Field of the Invention

The present invention relates to an improvement of the clamping device for camera lens hoods.

2. Description of the Prior Art

The lens hood is an accessory mounted around the outer periphery of a built-in lens hood which is telescopically mounted on the lens barrel or its outer sleeve in a camera. There are known various methods for mounting the lens hood on the outer sleeve. One of these methods is that the threaded end of the lens hood is engaged by a threaded attachment portion provided on the forward end of the lens barrel to fixedly mount the hood on the lens barrel.

A second method is also known in which the lens hood is mounted over and secured to the outer periphery of the forward end of the lens barrel by means of a screw member which is threadedly engaged in a lateral threaded aperture provided through the sidewall of the lens hood.

One of the clamping devices constructed in accordance with the above second method is disclosed in U.S. Pat. No. 3,384,767. This clamping device comprises a pair of projections extending radially inwardly from the inner periphery of a lens hood at one end and spaced away from each other, a fixing pin member being located on the lens hood at a different place and movable radially relative to the hood, and a spring for biasing the fixing pin member inwardly. The clamping device disclosed in the above U.S. Patent is advantageous in that it has a relatively simple construction so as to facilitate the mounting and removal of the lens hood. Since the hood is fixed to the camera portion by spring biasing the pin member, however, the hood can easily and undesirably fall off the lens barrel if a large force is applied to the side of the hood against the biasing force of the spring when the hood is to be mounted on the lens barrel. When the tips of the projections engage in a V-shaped groove on the forward end of the lens barrel and if the pin member is placed in its outward position, the tip of the pin member may override a collar near the V-shaped groove so that the lens hood will undesirably move inwardly beyond a predetermined setting position to completely cover the rearward portion of the lens barrel.

SUMMARY OF THE INVENTION

It is an object of the present invention to overcome the above problems in the prior art and to provide an improved clamping device for camera accessories such as a lens hood which can provide more positive connection with the lens barrel.

In accordance with the present invention, the clamping device includes a cylindrical adaptor member defining a lens hood, the inner periphery of the adaptor member being formed with an annular collar member which has an internal diameter smaller than the external diameter of a collar formed on the outer sleeve of a lens barrel along a V-shaped groove which is formed on the outer periphery of the outer sleeve.

Said collar member serves to prevent the hood from connecting with the lens barrel at an undesirable position.

BRIEF DESCRIPTION OF THE DRAWINGS

FIG. 1 is a cross-sectional view, taken along a line I—I in FIG. 2, of one embodiment of the present invention, showing a lens hood mounted on the outer sleeve of a lens barrel;

FIG. 2 is a cross-sectional view taken along a line II—II in FIG. 1;

FIG. 3 is a perspective view of the lens hood, with part being shown in section;

FIG. 4 is a cross-sectional view taken along a line IV—IV in FIG. 5, showing the lens hood being mounted on the outer barrel.

DESCRIPTION OF PREFERRED EMBODIMENTS

Figure 5:
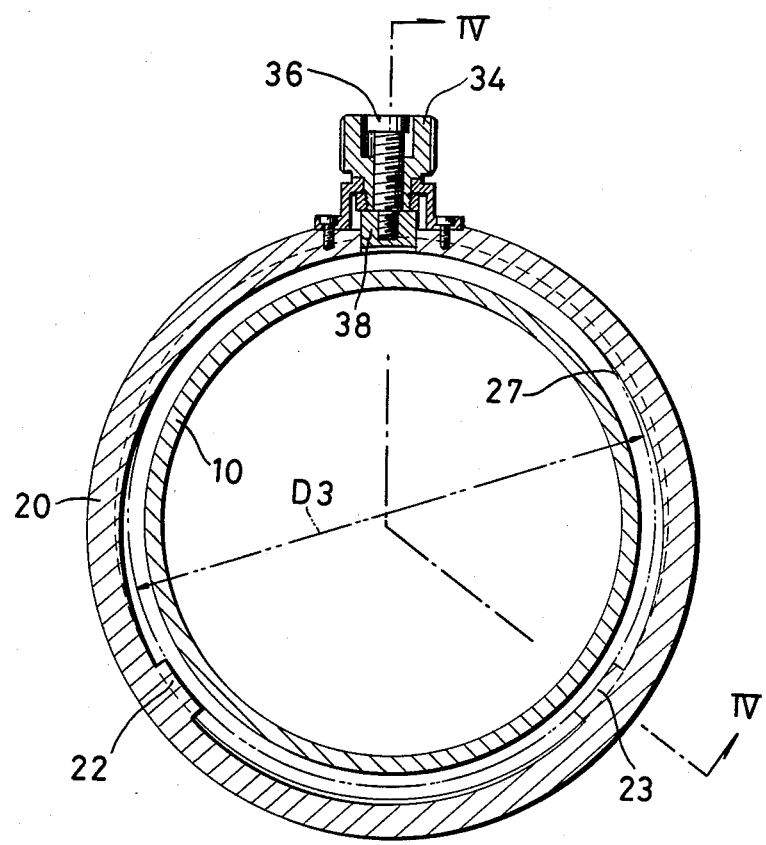
FIG. 5 is a cross-sectional view taken along a line V—V in FIG. 4.

Referring now to FIGS. 1 and 2, there is shown an outer sleeve 10 of a lens barrel, which is formed at the tip with an annular groove 11 around the outer periphery of the outer sleeve 10. The groove 11 divides the outer diameter of the outer sleeve 10 into a smaller diameter section represented by D1 and a larger diameter section denoted by D2.

The annular groove 11 includes a slant 12 formed thereon at the forward side of the outer sleeve 10, with the opposite side thereof providing a face perpendicular to the optical axis. This face defines a collar 13.

A lens hood 20 is formed at the inner periphery with an annular, inwardly extending collar 27, as shown in FIG. 3. The collar 27 includes an aperture of rectangular cross-section 21 formed therethrough and a pair of projections 22 and 23 inwardly extending therefrom and positioned to an opposite side of the inner periphery of the lens hood relative to aperture 21, as shown. The aperture 21 and projections 22 and 23 are angularly spaced away from one another by substantially equal angles, that is, by 120 degrees. Each of the projections 22 and 23 is of the same width as that of the collar 27, with the opposite sides being perpendicular to the optical axis. The top face of each of the projections 22 and 23 includes lateral slants (22a, 22b; 23a, 23b) formed therein symmetrically at the opposite sides. For clarification, however, the slants 23a and 23b are not shown in the drawings. Each of the projections 22 and 23 is engaged at one side by the collar 13 on the outer sleeve 10 while the slant 12 of the outer sleeve 10 is engaged by the slants 22b and 23b on the respective projections 22 and 23.

In such an arrangement, as inscribed circle C having a diameter D3 is defined by the inner periphery of the collar 27 near the rectangular aperture 21 of the hood and the inner peripheries of the projections 22 and 23. The diameter D3 is larger than the external diameter D1 of the smaller diameter section of the outer sleeve 10. The collar 27 has an internal diameter D4 smaller than the external diameter D2 of the larger diameter section of the outer sleeve 10. It is apparent that the diameter D3 of the above inscribed circle is smaller than the internal diameter D4 of the collar 27. Therefore, the relationship between these diameters can be represented by D1<D3<D4<D2.

A bearing 33 is attached to the outer periphery of the hood 20 by means of a machine screw 31. The bearing 33 rotatably receives a knob 34 for operating the clamp, the knob 34 being held by means of a retainer ring 35. The knob 34 includes a threaded bore formed axially therethrough, in which a screw member 36 is screwed. The inner end of the screw member 36 is further screwed into the threaded hole in a clamp member 38 which is of a rectangular cross-section and fitted into said rectangular aperture 21. The clamp member 38 has a width along the direction of the optical axis, which is substantially equal to that of the collar 27. The opposite sides of the clamp member 38 are perpendicular to the optical axis and are engaged by the collar 13 on the outer sleeve 10. The inner end face of the clamp member 38 includes symmetrically lateral slants 38a and 38b formed thereon as in the case of the slants on projections 22 and 23. In the illustrated embodiment, the slant 38a is engaged by the slant 12 on the outer sleeve 10.

When the hood 20 is to be mounted on the outer sleeve 10, the knob 34 is manually rotated to retract the clamp member 38 into the collar 27, as shown in FIGS. 4 and 5. Since the knob 34 is fitted into the bearing 33 and the screw member 36 is threadingly engaged by the knob 34, the clamp member 38 is thus moved linearly under guidance of the rectangular aperture 21. Since the diameter D3 of the inscribed circle C is larger than the external diameter D1 of the smaller diameter section of the outer sleeve 10 on the lens barrel, the hood will be displaced slightly downwardly toward the optical axis such that the hood can be positioned over the lens barrel at such a position as shown in FIGS. 4 and 5. Since both the internal diameter D4 of the collar 27 and the diameter D3 of the inscribed circle C are smaller than the external diameter D2 of the larger diameter section of the outer sleeve 10, the side walls of the projections 22 and 23 and the collar 27 are positively engaged by the collar 13 of the outer sleeve 10 without interference of the projections 22 and 23 with the smaller diameter section of the outer sleeve 10. Accordingly, the hood can positively positioned on the outer sleeve 10 at a predetermined location. Furthermore, the hood will never be tilted relative to the outer sleeve 10 since the hood engages the outer sleeve 10 through the projections 22, 23 and collar 27 over the entire circumference.

When the hood 20 is then moved slightly upwardly to move the projections 22 and 23 into the annular groove 11 and if the knob 34 is rotated to inwardly move the clamp member 38, the hood will be placed under such a state as shown in FIGS. 1 and 2. By then sufficiently tightening the knob 34, the hood can completely be mounted on the outer sleeve 10. At this time, the projections 22, 23 and clamp member 38 can be positively guided into the annular groove 11 by the engagement of the respective slants 22a, 23a and 38a with the slant 12 in the annular groove 11. Subsequently, the respective sides of the projections and clamp will be closely contacted by the collar 13.

Under such a state, the lens hood 20 is three-point supported by the projections 22, 23 and clamp member 38. This provides a stable support. Furthermore, since the clamp member 38 will not be moved unless the knob 34 is rotated, the lens hood 20 will never move relative to the outer sleeve 10 in the radial direction. Since the collar 13 of the outer sleeve 10 has the external diameter D2 larger than the internal diameter D4 of the collar 27 on the hood 20, any thrust on the hood 20 will be supported by the collar 13 throughout the circumference of the outer sleeve 10 such that the projections 22, 23 and clamp 38 will never be deformed or damaged.

As described hereinbefore, the clamp member 38 and projections 22, 23 are of symmetrical cross-section relative to the optical axis. When the hood is not to be used, therefore, it can be mounted inversely on the outer sleeve. In such a case, the hood can be handled in substantially the same manner as previously described with respect to the normal mounting operation.

We claim:

1. A clamping device for fixedly securing an accessory such as a lens hood to the outer periphery of a lens barrel, said lens barrel including a cylindrical outer sleeve which includes an annular collar portion formed thereon around the external circumference thereof near the forward end of said outer sleeve, and an annular groove being formed along said collar portion between said collar portion and the forward end of said outer sleeve, the device comprising:

(a) a cylindrical adaptor member having an internal diameter larger than the external diameter of said annular collar portion;

(b) an annular collar member formed on said adaptor member around the circumference thereof and extending radially inwardly from said adaptor member, said collar member having an inner periphery of a diameter larger than the external diameter of said outer sleeve and smaller than the external diameter of said collar portion;

(c) a clamp member extending from the outside of the cylindrical form of said adaptor member through said adaptor member and said collar member, said clamp member including an engagement portion movable between a first position in which said engagement portion is disposed radially inwardly from the inner periphery of said collar member and a second position in which said engagement portion is retracted from said first position and means for holding said engagement portion at least at said first position, said engagement portion being adapted to fit into said groove on said outer sleeve in said first position; and (d) a plurality of projection members extending radially inwardly from the inner periphery of said collar member, an inner end of each of said projection members being adapted to fit into the groove of said outer sleeve.

2. A clamping device as defined in claim 1 wherein the extended distance of each of said projection members is selected such that the diameter of an inscribed circle defined by the inner ends of said projection members and the inner periphery of said collar member near said clamp member is larger than the external diameter of said outer sleeve.

3. A clamping device as defined in claim 1 wherein said clamp member includes an operating member on the outer periphery of said adaptor member and screw connection means for operatively connecting said operating member and said engagement portion.

4. A clamping device as defined in claim 1 wherein said projection members are disposed in such a manner as to position said adaptor member in cooperation with said engagement portion of said clamp member such that the cylindrical axis of said adaptor member corresponds with the cylindrical axis of said lens barrel.

5. A clamping device as defined in claim 1 wherein said projection members include a pair of projections positioned to an opposite side of the inner periphery of said adaptor member relative to the engagement portion of said clamp member.

6. A clamping device for fixedly securing an accessory such as a lens hood to the outer periphery of a long barrel, said lens barrel including a cylindrical outer sleeve which includes an annular collar portion formed thereon around the external circumference thereof near the forward end of said outer sleeve, and an annular groove being formed along said collar portion between said collar portion and the forward end of said outer sleeve, the device comprising:

(a) a cylindrical adaptor member having an internal diameter larger than the external diameter of said annular collar portion;

(b) an annular collar member formed on said adaptor member around the circumference thereof and extending radially inwardly from said adaptor member, said collar member having an inner periphery of a diameter larger than the external diameter of said outer sleeve and smaller than the external diameter of said collar portion;

(c) a clamp member extending from the outside of the cylindrical form of said adaptor member through said adaptor member and said collar member, said clamp member including an engagement portion movable between a first position in which said engagement portion is disposed radially inwardly from the inner periphery of said collar member and a second position in which said engagement portion is retracted from said first position and means for holding said engagement portion at least at said first position, said engagement portion being adapted to fit into said groove on said outer sleeve in said first position; and (d) at least one projection member extending radially inwardly from the inner periphery of said collar member and having an inner end adapted to fit into the groove of said outer sleeve, said projection member and said clamp member being positioned to opposite sides of the inner periphery of said collar member.

7. A clamping device as defined in claim 6 wherein the extended distance of said projection member is selected such that the diameter of an inscribed circle defined by the inner end of said projection member and the inner periphery of said collar member near said clamp member is larger than the external diameter of said outer sleeve.

8. A clamping device as defined in claim 6 wherein said clamp member includes an operating member on the outer periphery of said adaptor member and screw connection means for operatively connecting said operating member and said engagement portion.

* * * * *